United States Patent [19]
Schlinker et al.

[11] Patent Number: 5,613,649
[45] Date of Patent: Mar. 25, 1997

[54] AIRFOIL NOISE CONTROL

[75] Inventors: Robert H. Schlinker, Canton, Conn.; Edward J. Kerschen, Tuscon, Ariz.

[73] Assignee: United Technologies Corporation, Hartford, Conn.

[21] Appl. No.: 278,439

[22] Filed: Jul. 21, 1994

[51] Int. Cl.$^6$ ............................ B64C 21/02; B64C 9/14; B64C 9/22
[52] U.S. Cl. ........................ 244/1 N; 244/204; 244/210
[58] Field of Search ........................ 244/1 R, 1 N, 244/204, 209, 210, 118, 198

[56] References Cited

U.S. PATENT DOCUMENTS

| | | | |
|---|---|---|---|
| 1,918,536 | 7/1933 | Griswold, 2D | 244/198 |
| 2,173,832 | 9/1939 | Fahrney | 244/204 |
| 2,340,417 | 2/1944 | Ellett | 244/198 |
| 2,988,302 | 6/1961 | Smith | 244/209 |
| 3,093,350 | 6/1963 | Wilkins | 244/209 |
| 3,174,282 | 3/1965 | Harrison | 244/1 N |
| 3,521,837 | 7/1970 | Papst | 244/209 |
| 4,664,345 | 5/1987 | Lurz | 244/209 |
| 4,749,150 | 6/1988 | Rose et al. | 244/1 N |
| 5,141,182 | 8/1992 | Coffinberry | 244/209 |
| 5,291,672 | 3/1994 | Brown | 244/1 N |
| 5,348,256 | 9/1994 | Parikh | 244/35 A |
| 5,423,658 | 6/1995 | Pla et al. | 244/1 N |

FOREIGN PATENT DOCUMENTS

| | | | |
|---|---|---|---|
| 3913678 | 7/1990 | Denmark | 244/204 |
| 264144 | 4/1988 | European Pat. Off. | 244/204 |
| 558904 | 9/1993 | European Pat. Off. | 244/204 |
| 2681833 | 4/1993 | France | 244/198 |
| 2093152 | 8/1982 | United Kingdom | 244/198 |

OTHER PUBLICATIONS

Simonson, "Reduction of Fan Noise" NASA Tech Brief Jul. 1972 B72–10040.

Paper entitled "Active Control of Wake–Airfoil Interaction Noise by Compact Leading–Edge Actuators"; author, E.J. Kerschen; unpublished.

*Primary Examiner*—Andres Kashnikow
*Assistant Examiner*—Virna Lissi Mojica
*Attorney, Agent, or Firm*—Troxell K. Snyder

[57] ABSTRACT

Acoustic noise resulting from the interaction of a periodic pressure and velocity fluctuation induced by a periodically passing blade wake interacting with a downstream airfoil (10) is attenuated by locating an antisymmetric pressure wave generator (30) adjacent the leading edge (18) of the vane (10).

7 Claims, 2 Drawing Sheets

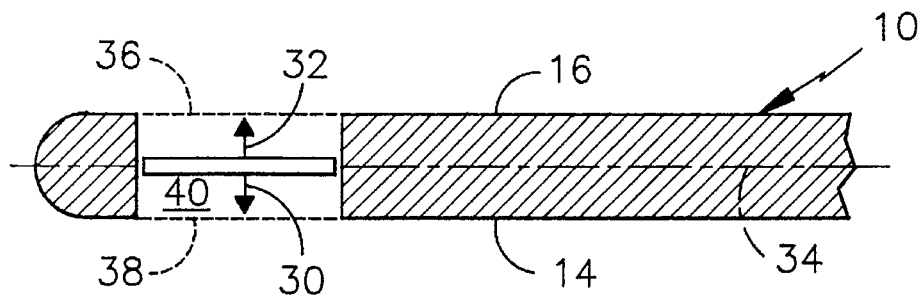
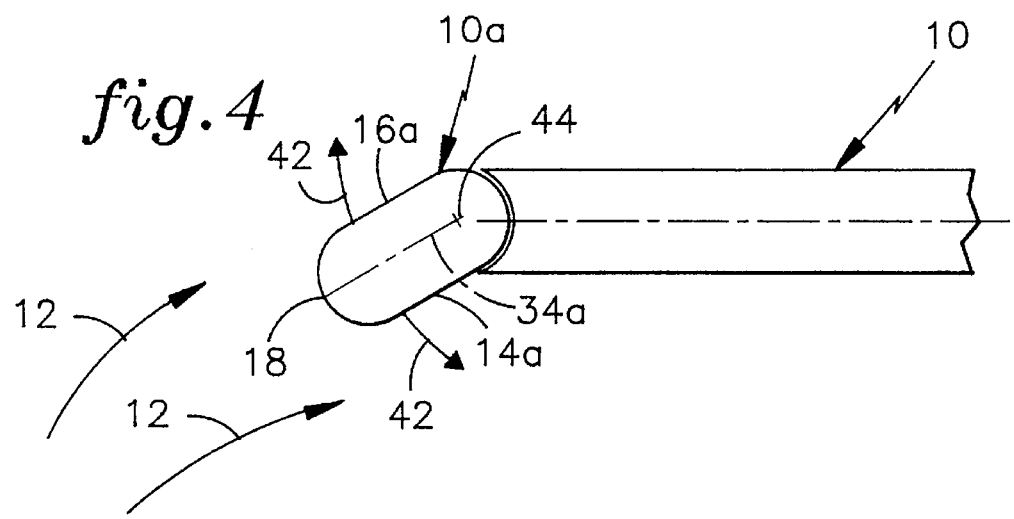
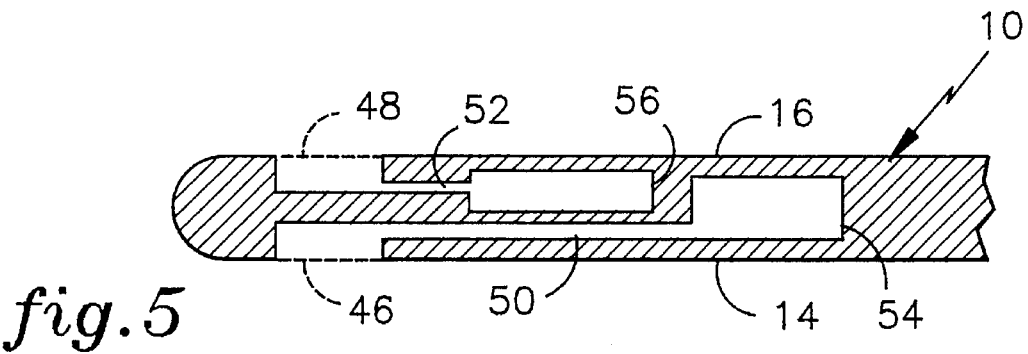

AIRFOIL NOISE CONTROL

TECHNICAL FIELD

The present invention relates to a means for cancelling noise generated by an airfoil.

BACKGROUND ART

Active control of noise generated by airfoils, and in particular noise generated by airfoils in serially arranged cascades of rotating and stationary airfoils such as maybe found in the compressor or turbine section of a gas turbine engine, has recently received increased attention by the designers and manufacturers of such engines. One significant component of the noise generated in these engines is caused by the interaction between the moving pressure wake extending downstream from each of the moving airfoil blades and the leading edges of each of the stationary airfoil vanes. The wake, which includes both pressure and velocity fluctuations strikes the leading edge of the downstream stator vane, resulting in the generation of an acoustic pressure wave which, in certain frequency ranges, is perceived as noise.

Methods of attenuating this acoustic noise generated in the engine have included sound absorbing liners, mixers, and other devices to absorb or otherwise contain the generated noise within the gas turbine engine or its surrounding enclosure.

While such methods have been somewhat effective, there remains a need for further, effective reduction of the acoustic noise generated by the interaction of the trailing wakes and stator vane leading edges.

DISCLOSURE OF INVENTION

The present invention provides a means for attenuating the sound generated by the interaction of the leading edge of an airfoil upon encountering a velocity/pressure fluctuation as may be generated, for example, downstream of a rotating blade cascade in an axial flow gas turbine engine, or the like. The invention reduces the number of actuators to a minimum, while achieving sound reduction on the order of 10 db.

According to the present invention, an airfoil encountering a periodic pressure and velocity fluctuation at the leading edge is equipped with a volumetric source-sink or other means for generating an antisymmetric pressure wave having a phase and amplitude sized to cancel the acoustic pressure wave generated by the interaction between the fluctuation and the airfoil leading edge. The source-sink is located adjacent the leading edge, wherein adjacent is defined as being within one acoustic wavelength of the leading edge.

According to alternate embodiments of the invention, several means for generating and antisymmetric acoustic pressure wave are described, including a buried piston, surface pistons, and a moveable leading edge flap.

BRIEF DESCRIPTION OF DRAWINGS

FIG. 2 is a graph of the variation of leading edge static pressure over time for a stator vane airfoil in a gas turbine engine, or the like.

FIGS. 3, 4, and 5 are schematic representations of three embodiments of airfoils according to the present invention.

BEST MODE FOR CARRYING OUT THE INVENTION

Figure 1:
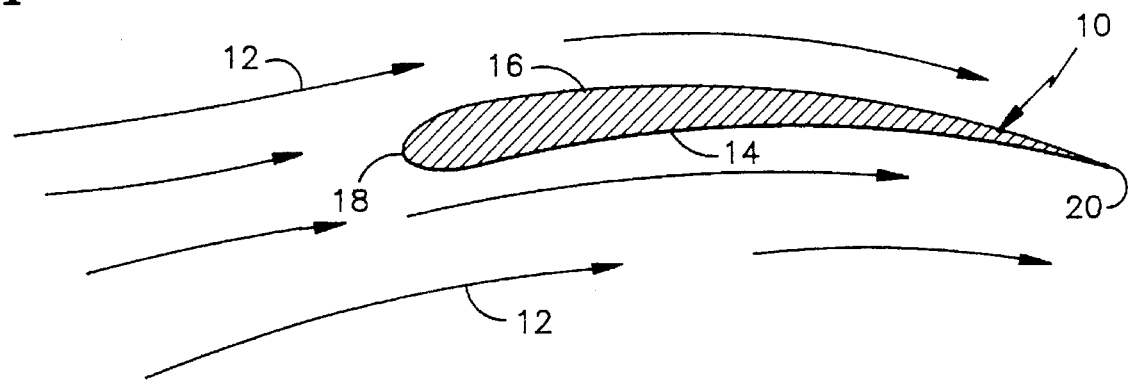
FIG. 1 shows a cross section of an airfoil having an indicated flow of fluid over the exterior surfaces thereof.

FIG. 1 shows a cross section of a typical airfoil 10 disposed in a surrounding fluid flow field 12. The airfoil 10 includes a pressure surface 14, a suction surface 16, a leading edge 18, and a trailing edge 20. The terms relating to the airfoil and external fluid flow field are used herein in their conventional sense.

Figure 2:
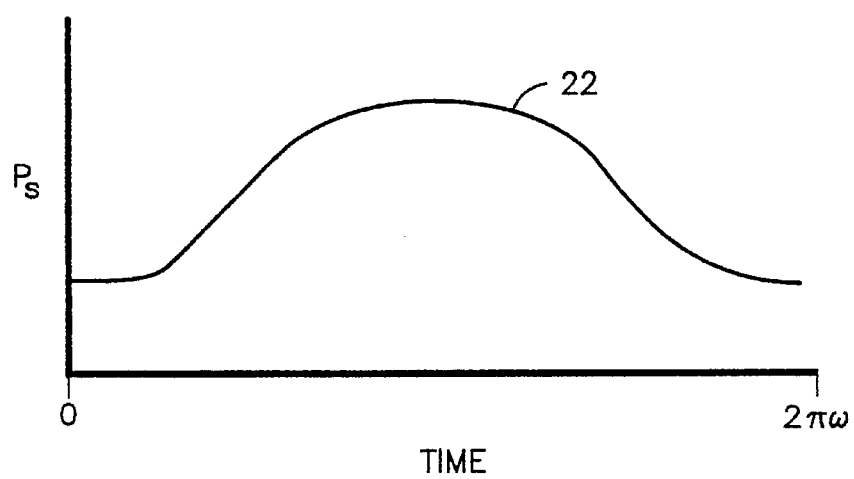

Referring to FIG. 2, the time variation 22 of the static pressure measured at the leading edge of an airfoil 10 is shown. Such variations are common for stationary airfoils, or stator vanes, located downstream of a rotating annular cascade of airfoil blades such as are found in a axial flow gas turbine engine, for the like. The pressure fluctuation shown in FIG. 2 is caused by the wake region extending downstream of the trailing edge of the upstream moving blades (not shown) which passes over the downstream stationary airfoil 10 at a frequency directly proportional to the rotational speed of the annular blade cascade.

It is well known in the art of acoustics that the interaction of the pressure, and hence velocity, fluctuation with the downstream airfoil 10 will initiate a further series of pressure fluctuations in the flow field 12 which, for axially flow gas turbine engines such as are used for aircraft propulsion, may be perceived by an outside observer as objectionable acoustic noise. The present invention addresses the attenuation or elimination of such objectionable noise resulting from the interaction of the periodic pressure and velocity fluctuations with the vane airfoil 10.

It can be shown (see "Active Control of Wake-Airfoil Interaction Noise by Compact Leading-Edge Actuators" E. J. Kerschen, unpublished, incorporated herein by reference) that attenuation of acoustic noise of up to 10 db or greater may be achieved by placing a means for generating a sound cancelling pressure fluctuation adjacent the airfoil leading edge 18. This generated pressure fluctuation, also termed "antisound" is of sufficient magnitude and proper phase so as to cancel a substantial portion of the acoustic noise generated by the vane-wake interaction described above. Proper use of such antisound can result in improved performance of a gas turbine engine in terms of sound reduction or elimination, with very little impact on engine operatability, weight, cost, etc.

According to the present invention, two parameters are critical for the successful attenuation of the vane-wake interaction noise: first, the means for generating the antisound pressure fluctuations must be located adjacent the leading edge 18 of the airfoil 10. Adjacent, as used herein, means that the antisound pressure fluctuation generating means is displaced no more than a fraction of an acoustic noise wavelength from the leading edge 18.

Second, the antisound pressure fluctuation generating means must produce an antisymmetric pressure wave with respect to the airfoil. Antisymmetric, as used herein, means an induced periodic pressure field wherein, for example, at any given time the induced pressure fluctuation is negative on one side of the airfoil 10, and simultaneously positive on the other side of the airfoil. Having placed the antisound fluctuation generating means according to the preceding parameters, significant attenuation of the vane-wake interaction acoustic noise may be achieved by properly choosing the amplitude, phase, and frequency of the generated antisound pressure fluctuation.

The three examples of means for generating the proper antisound pressure fluctuation are shown in FIGS. 3, 4, and 5, and will be described herein below. FIG. 3 shows an embodiment according to the present invention wherein a buried piston is provided for generating the antisymmetric pressure fluctuation. The piston 30 oscillates 32 transversely with respect to the chordal dimension 34 of the vane 10. The piston is termed buried as it is disposed within the interior of the vane 10 as defined by the external surfaces 14, 16. The surfaces 36, 38 immediately above and below the piston 30 as shown as in the embodiment of FIG. 3 are porous, thereby allowing the external fluid 12 to enter and leave the piston chamber 40 as the piston 30 moves in periodic displacement 32.

FIG. 4 shows an alternate embodiment for generating an antisymmetric pressure fluctuation adjacent to the leading edge 18 of a vane 10 wherein the vane includes a moveable portion 10a which includes the leading edge 18. As vane portion 10a oscillates 42 about a hinge or other flexible joint 44, the angle formed between the chordal dimension 34a of the forward vane portion 10a and the velocity vector of the external fluid flow 12 is varied. Variation of this angle, also termed of the angle of attack of the airfoil, results in a variation of the surface pressure on the pressure and suction surfaces 14a, 16a, thereby achieving the antisymmetric pressure fluctuation field according to the present invention.

FIG. 5 shows still another alternate embodiment wherein the antisymmetric antisound pressure fluctuation is generated by purely passive means. In the embodiment of FIG. 5, openings 46, 48 are disposed in the respective pressure 14 and suction 16 surfaces of the airfoil 10. The openings 46, 48 are in fluid communication 50, 52 with resonating chambers 54, 56 shown, in this embodiment, as being disposed within the interior of the airfoil 10. By properly sizing the openings 46, 48, the fluid communication conduits 50, 52, and the chambers 54, 56, one skilled in the art may construct a passive resonator wherein the periodic external pressure fluctuation induced by the interaction of the wake and vane will result in the formation of a standing pressure wave within each resonator system having the desired phase, amplitude, and frequency for producing and antisound, antisymmetric pressure fluctuation. While such passage system may have the disadvantage of being less adaptable to varying wake pressure-velocity fluctuation frequencies, the passive system as shown in FIG. 5 has the advantage of requiring little or no active manipulation or control.

As would be appreciated by those skilled in the art, the forgoing embodiments are merely illustrative of physical means of accomplishing of the attenuation of acoustic noise as taught by the present invention. For example, instead of a single buried piston as shown in FIG. 3, two sperate pistons or moveable membranes may be disposed contiguous with the pressure and suction surfaces 14, 16 of the vane 10, each surface piston or membrane being actuated so as to result in the generation of an antisymmetric pressure fluctuation according to the present invention.

Other arrangements and advantages will become apparent to those skilled in the art upon review of the forgoing specification and the appended claims and drawing figures.

We claim:

1. In an airfoil having a pressure surface, a suction surface, a leading edge and a chordal dimension, and wherein said airfoil is subject to a flow of fluid over said surfaces, said fluid flow defining a regularly fluctuating pressure and flow field, and wherein the interaction of said airfoil and said fluid flow results in the generation of acoustic noise having a characteristic frequency and wavelength, the improvement comprising wherein said airfoil includes means disposed adjacent the leading edge of said airfoil, for generating an antisymmetric periodic pressure field whereby said acoustic noise is attenuated.

2. The airfoil as recited in claim 1, wherein the generating means further comprises a moveable portion of said airfoil, disposed at the leading edge thereof.

3. The airfoil as recited in claim 1, wherein the generating means further comprises a volumetric alternating source-sink, disposed adjacent the leading edge.

4. In an airfoil having a pressure surface, a suction surface, a leading edge and a chordal dimension, and wherein said airfoil is subject to a flow of fluid over said surfaces, said fluid flow defining a regularly fluctuating pressure and flow field, and wherein the interaction of said airfoil and said fluid flow results in the generation of acoustic noise having a characteristic frequency and wavelength, the improvement comprising means, disposed adjacent the leading edge of said airfoil, for generating an antisymmetric periodic pressure field whereby said acoustic noise is attenuated, said generating means including a volumetric alternating source-sink, disposed adjacent the leading edge including a piston, disposed within said airfoil and being moveable therewithin, the piston having generally opposite first and second sides, the first side being in fluid communication with a portion of the fluid flow adjacent the pressure surface, and the second side being in fluid communication with an other portion of the fluid flow adjacent the suction surface.

5. The airfoil as recited in claim 4, wherein the fluid communication between the first piston side and the pressure surface fluid flow portion includes a porous barrier forming a continuous surface with the adjoining pressure surface, and wherein the fluid communication between the second piston side and the suction surface fluid flow portion includes a porous barrier forming a continuous surface with the adjoining suction surface.

6. The airfoil as recited in claim 3, wherein the source-sink further comprises a passive resonant chamber, having an acoustic impedance adapted to resonate at the frequency of the acoustic noise.

7. The airfoil as recited in claim 1, wherein the generating means is disposed within 1.0 acoustic wavelength of the leading edge.

\* \* \* \* \*